United States Patent [19]
Anderson et al.

[11] Patent Number: 5,761,453
[45] Date of Patent: Jun. 2, 1998

[54] METHOD AND SYSTEM FOR INCREASING THE THROUGHPUT OF SERIAL DATA IN A COMPUTER SYSTEM

[75] Inventors: Eric C. Anderson, San Jose; Scott F. Fullam, Mountain View; Patricia A. Scardino, Fremont, all of Calif.

[73] Assignee: Apple Computer, Inc., Cupertino, Calif.

[21] Appl. No.: 568,542

[22] Filed: Dec. 7, 1995

[51] Int. Cl.$^6$ .................................................. G06F 13/00
[52] U.S. Cl. .................................. 395/306; 395/842
[58] Field of Search .......................... 395/842, 821, 395/200.07, 200.01, 200.13, 306, 280, 854; 370/60, 94.1

[56] References Cited

U.S. PATENT DOCUMENTS

| | | | |
|---|---|---|---|
| 4,942,515 | 7/1990 | Marzucco et al. | 395/842 |
| 5,142,628 | 8/1992 | Okochi et al. | 395/200.07 |
| 5,307,351 | 4/1994 | Webster | 370/94.1 |
| 5,371,856 | 12/1994 | Yoshino et al. | 395/250 |
| 5,452,432 | 9/1995 | Macachor | 395/842 |
| 5,495,481 | 2/1996 | Duckwall | 370/85.2 |

*Primary Examiner*—Gopal C. Ray
*Attorney, Agent, or Firm*—Benman Collins & Sawyer

[57] ABSTRACT

A method and system provides for increasing the throughput of serial data in a computer system when a data packet is of unknown length. The method and system includes initializing a first count register to count a length field of the data packet, the length field including a value indication of the length of the data packet. The method and system further includes storing a count for a minimum data portion in a second count register and receiving the data packet from a serial device of the computer system. The method and system further provides for transferring the length value to the RAM of the computer system and loading the count for the minimum data portion into the first count register to provide primary chaining of the first count register to the second count register. The method and system finally provides for comparing a minimum data packet length to the length value in the RAM to determine whether to utilize secondary chaining of the first count register with the second count register.

18 Claims, 10 Drawing Sheets

5,761,453

METHOD AND SYSTEM FOR INCREASING THE THROUGHPUT OF SERIAL DATA IN A COMPUTER SYSTEM

FIELD OF THE INVENTION

The present invention relates generally to serial data transfer in a computer system, and more particularly to increasing the throughput of serial data in a computer system.

BACKGROUND OF THE INVENTION

In many computer environments today, computers interface with external, peripheral devices, such as modems, scanners, and other computer systems, via a serial interface at a serial input/output port. Typical components of computer systems with serial device connections include a central processing unit (CPU), random access memory (RAM), read only memory (ROM), and a serial controller. The RAM and ROM commonly store program information and data for the system, while the serial controller usually sends data to and receives data from the serial peripherals.

The serial controllers often reduce the amount of time the CPU needs to spend servicing the peripherals and thus reduce the amount of overhead these peripherals require, by only interrupting the CPU when data has been received at the controller or when the controller is ready to retrieve more data to be sent. Although this scheme reduces the amount of time spent 'polling' the peripheral by the CPU to determine readiness of data reception or transmission, the CPU still must service the serial controller, which correspondingly causes other programs in operation by the CPU to be slowed. Further, when the data transfer rate between the serial controller and the CPU increases, these other programs are increasingly slowed.

One attempt to reduce the amount of overhead time associated with serial data transfer involves the use of a direct memory access (DMA) system. The DMA system typically includes a DMA interface coupled to the serial controller and correspondingly, the RAM, and is set up by a DMA channel in the CPU to handle the data transfers between the memory and serial devices without any intervention by the CPU. Usually, there is a programmable number of bytes that the DMA system can handle transferring before interrupting the CPU to indicate the completion of the transfer.

If the transferred data packets are of known length, then the above-identified system works in an efficient manner. However, when the data packets received are of unknown length, the above system does not operate as efficiently. This inefficiency occurs because, if the packet is of unknown length, some mechanism is required that will provide the length information to the DMA channel. This is typically addressed in a conventional DMA system by sending a fixed length data packet identified as a "send request" which contains the length of the packet waiting to be sent. This is then acknowledged with a known length packet. The CPU then sets up the DMA channel to receive the packet of the specified length. The problem with such a system is that the DMA channel has no way of knowing when the packet is complete unless the length of the packet is known ahead of time. In so doing, a DMA system in accordance with this method requires significant CPU overhead and wastes CPU time and channel bandwidth.

Another method involves synchronous transfer. In this case, a protocol, such as HDLC, automatically indicates the end of a packet and an interrupt can be generated by the serial channel when this occurs. In this case, typically the DMA channel is programmed to receive the largest possible packet. Thus, packet termination is signalled by the CPU via the serial port interrupt, rather than a DMA channel interrupt.

Accordingly, what is needed is a method and a system for receiving asynchronous data packets of unknown length without requiring such a handshaking scheme to reduce CPU overhead and allow for efficient and complete transfer of serial data to and from memory. The present invention addresses such a need.

SUMMARY OF THE INVENTION

The present invention provides for a method and system for increasing the throughput of serial data in a computer system when a data packet is of unknown length. The method and system includes initializing a first count register to count a length field of the data packet, the length field including a value indication of the length of the data packet. The method and system further includes storing a count for a minimum data portion in a second count register. Further, the data packet is received from a serial device of the computer system. The method and system further provides for transferring the length field to the RAM of the computer system and loading the count for the minimum data portion into the first count register to provide primary chaining of the first count register to the second count register. The method and system finally provides for comparing a minimum data packet length to the length value in the RAM to determine whether to utilize secondary chaining of the first count register with the second count register.

Through the use of a system in accordance with the present invention, the amount of polling is substantially eliminated and the CPU overhead is substantially reduced. Therefore through the use of the present invention the throughput of the system is maximized. In a preferred embodiment, no polling would be required because the minimum data packet size would be equal to the counts in the two count registers. These and other advantages of the aspects of the present invention will be more fully understood in conjunction with the following detailed description and accompanying drawings.

DETAILED DESCRIPTION

Figure 1:
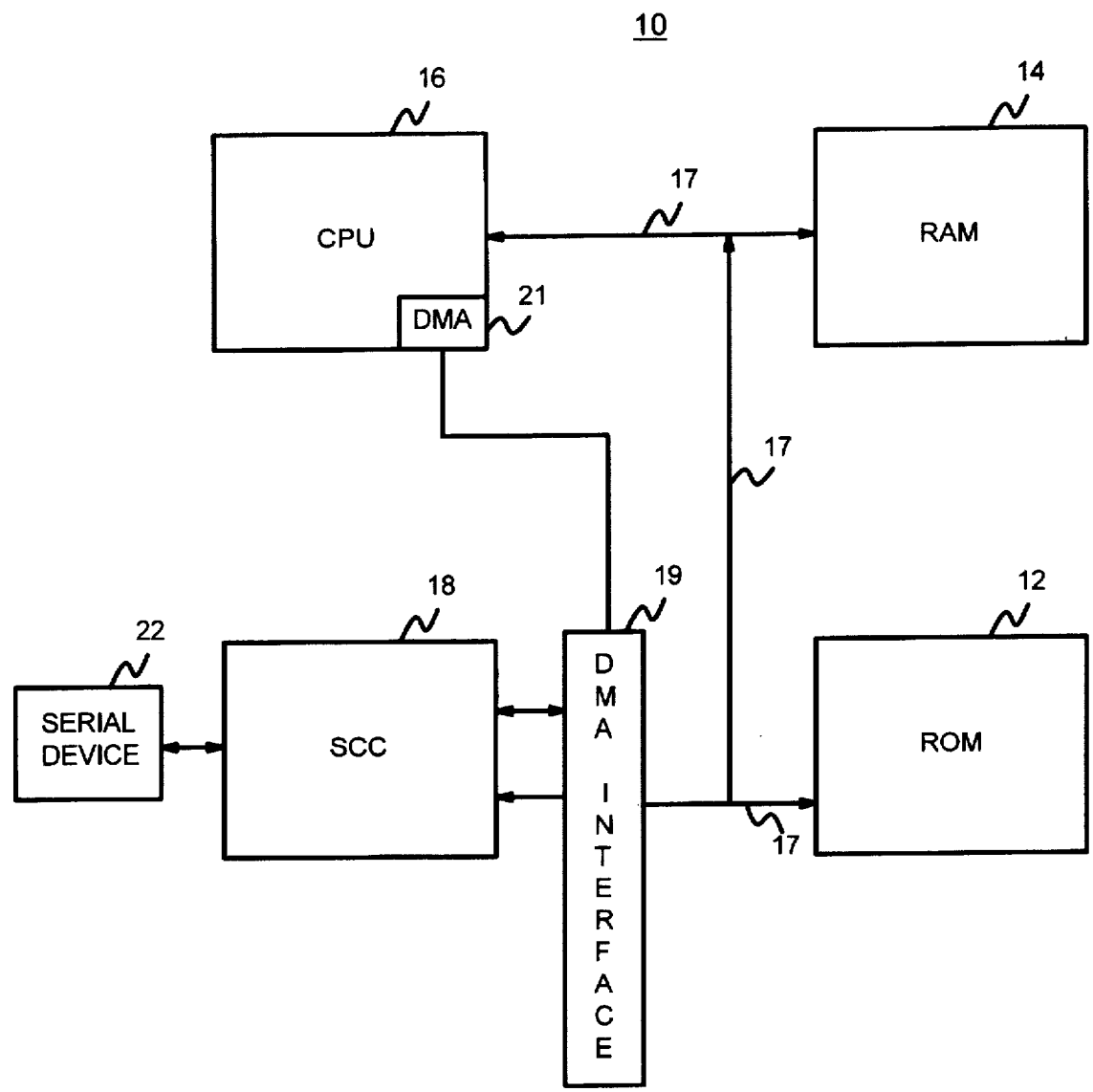
FIG. 1 illustrates a block diagram of a computer system in accordance with the present invention.

The present invention relates to an improvement in receiving a data packet of unknown length in a processing system. The following description is presented to enable one of ordinary skill in the art to make and use the invention and is provided in the context of a patent application and its requirements. Various modifications to the preferred embodiment and the generic principles and features described herein will be readily apparent to those skilled in the art. FIG. 1 illustrates a block diagram of a computer system 10 in accordance with the present invention. The computer system 10 includes a ROM 12 and RAM 14 coupled to a CPU 16 via a bus 17. CPU 16 is further coupled to serial communications controller (SCC) 18. The CPU 16 further includes a DMA channel 21. The DMA channel 21 is in turn coupled to DMA interface 19. The DMA interface 19 is coupled to the ROM 12 and RAM 14 via bus 17. The DMA interface 19 acts to handle data transactions between RAM 14 and SCC 18 without intervention by the CPU 16. The SCC 18 acts to send and receive serial data to/from serial device 22. It should be appreciated that the DMA interface 19 acts as an interface for the necessary handshaking during data transfer between the serial communications controller 18 and the RAM 14. The physical locations for the DMA interface 19 include but are not limited to: in the CPU 16 in an embedded system, in a separate memory control application specific integrated circuit (ASIC), and in the SCC 18, as is well appreciated by those skilled in the art. The DMA interface is only required if the SCC 18 does not have appropriate control signalling to support the DMA function directly.

Figure 2:
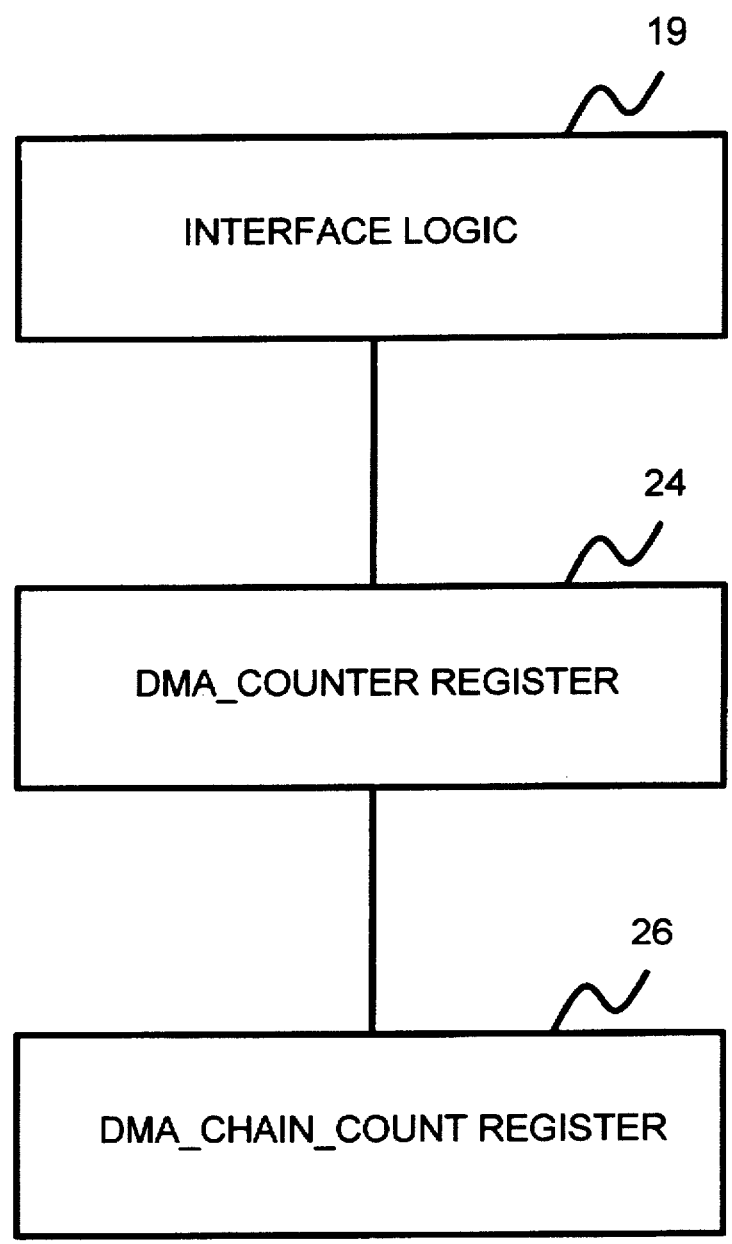
FIG. 2 illustrates a block diagram of a portion of a DMA channel in accordance with the present invention.

One type of DMA channel 21 includes only a single register to determine the length of an incoming data packet. A second type of DMA channel 21 is a chained type of DMA channel. In accordance with the present invention, a chained DMA channel configuration is shown in FIG. 2. The DMA channel 21 includes two count registers DMA_COUNT register 24 and DMA_CHAIN_COUNT register 26.

In this chained DMA channel configuration, the function of the count registers 24 and 26 in accordance with the present invention is to allow a minimum size of a data packet to be received without polling. As before mentioned, the DMA channel 21 interacts with DMA interface logic 19. The interface logic 19 preferably includes control logic components necessary for proper serial data transfer handling of a data packet with RAM 14, as is well appreciated by those skilled in the art.

Figure 3:
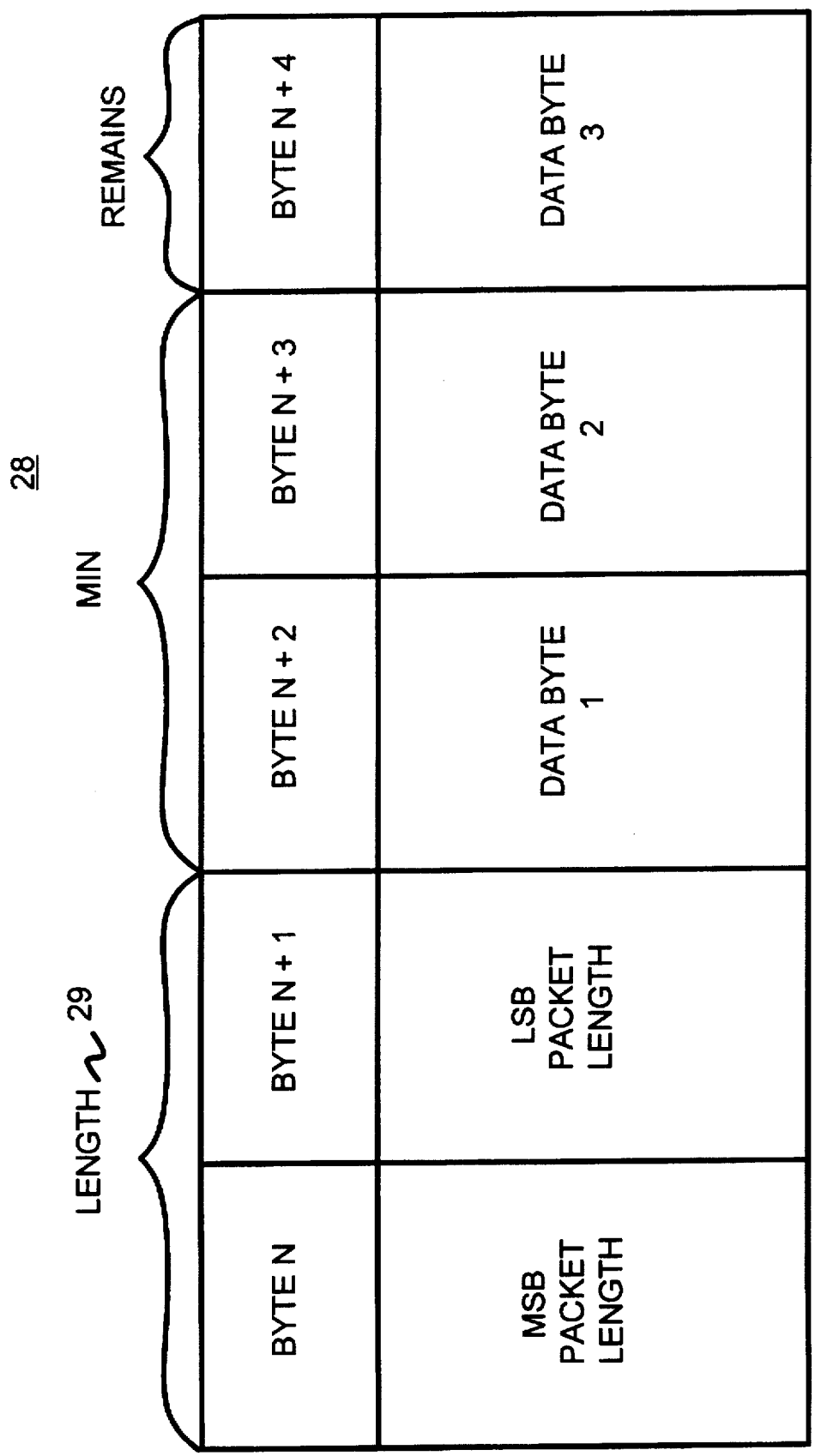
FIG. 3 illustrates portions of a serial data packet.

An illustration of a data packet 28 is presented in FIG. 3. An indication of the length of a data portion 29 of the data packet 28 being received from serial device 22 (FIG. 1) is preferably included in a length field of the data packet 28, e.g., the first two bytes of data with byte N, the most significant byte (MSB), and byte N+1, the least significant byte (LSB), respectively. The data bytes, bytes N+2, N+3, N+4, and so on, of the data portion contain the serial data of the data packet 28. For purposes of illustration with the present invention, these data bytes are designated as separate portions, such as bytes N+2 and N+3 representing a minimum (Min) portion of the data packet 28, and byte N+4 and beyond representing a remains portion of the data packet 28 beyond the minimum portion. Further, although the length value in the length field has been described as a length of a data portion of a data packet, it could also include the number of bytes for the length field itself. Of course, appropriate adjustments to the below-described arithmetic operations would also be necessary to utilize proper primary and secondary chaining.

Figure 4A:
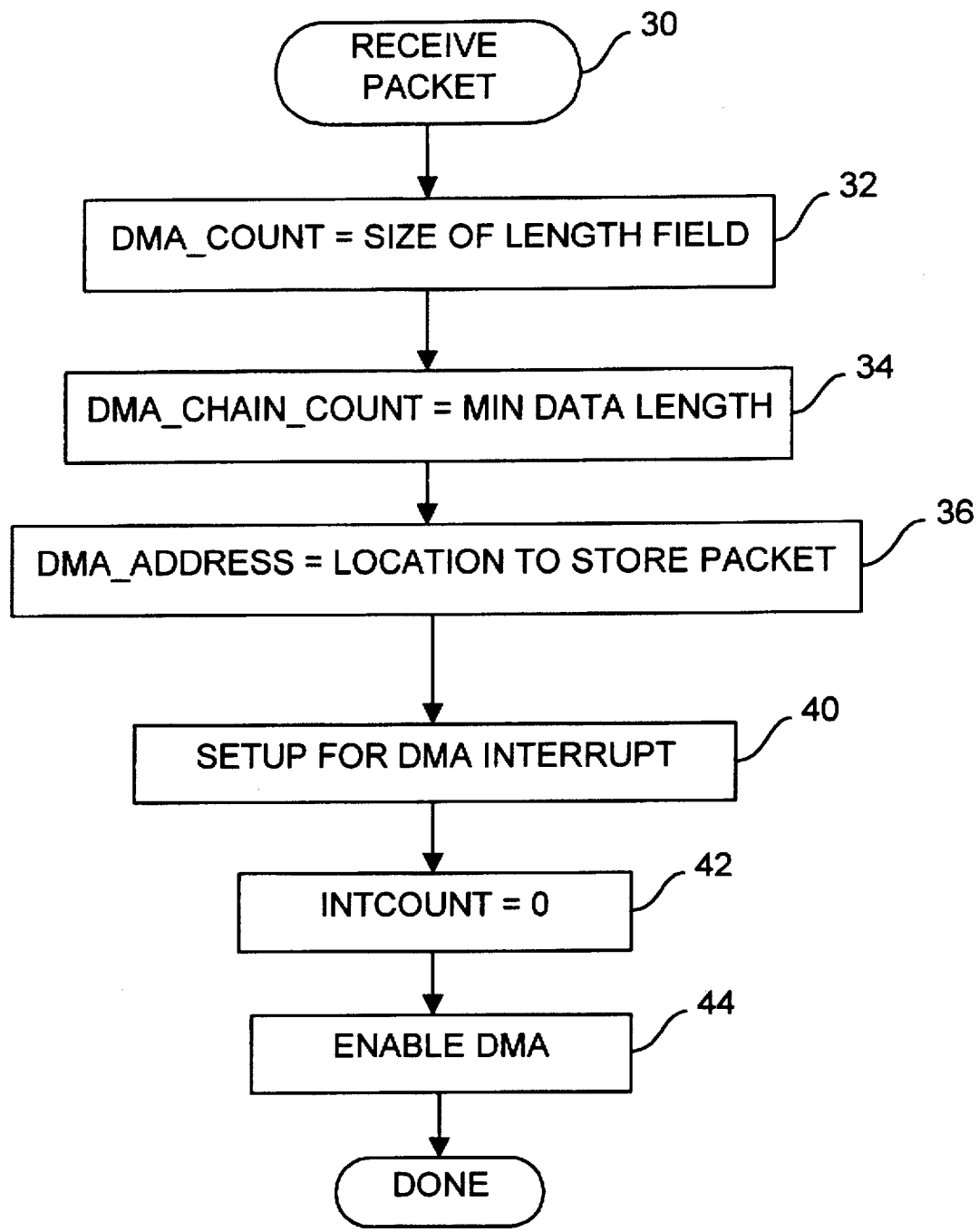
FIGS. 4(a), 4(b), and 5(a) are flow charts illustrating the operation of a system in accordance with the present invention.
Figure 4B:
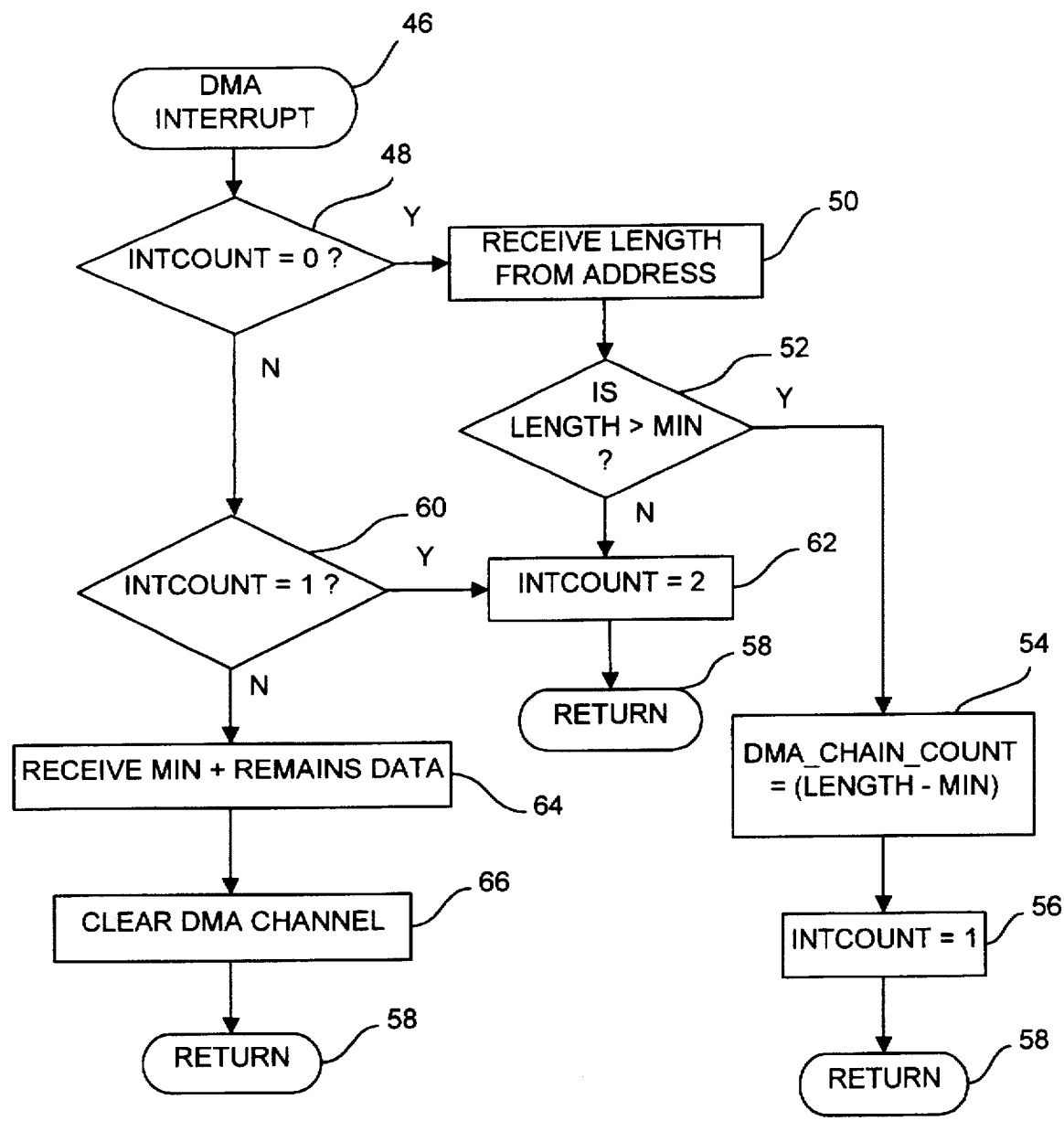
Figure 5A:
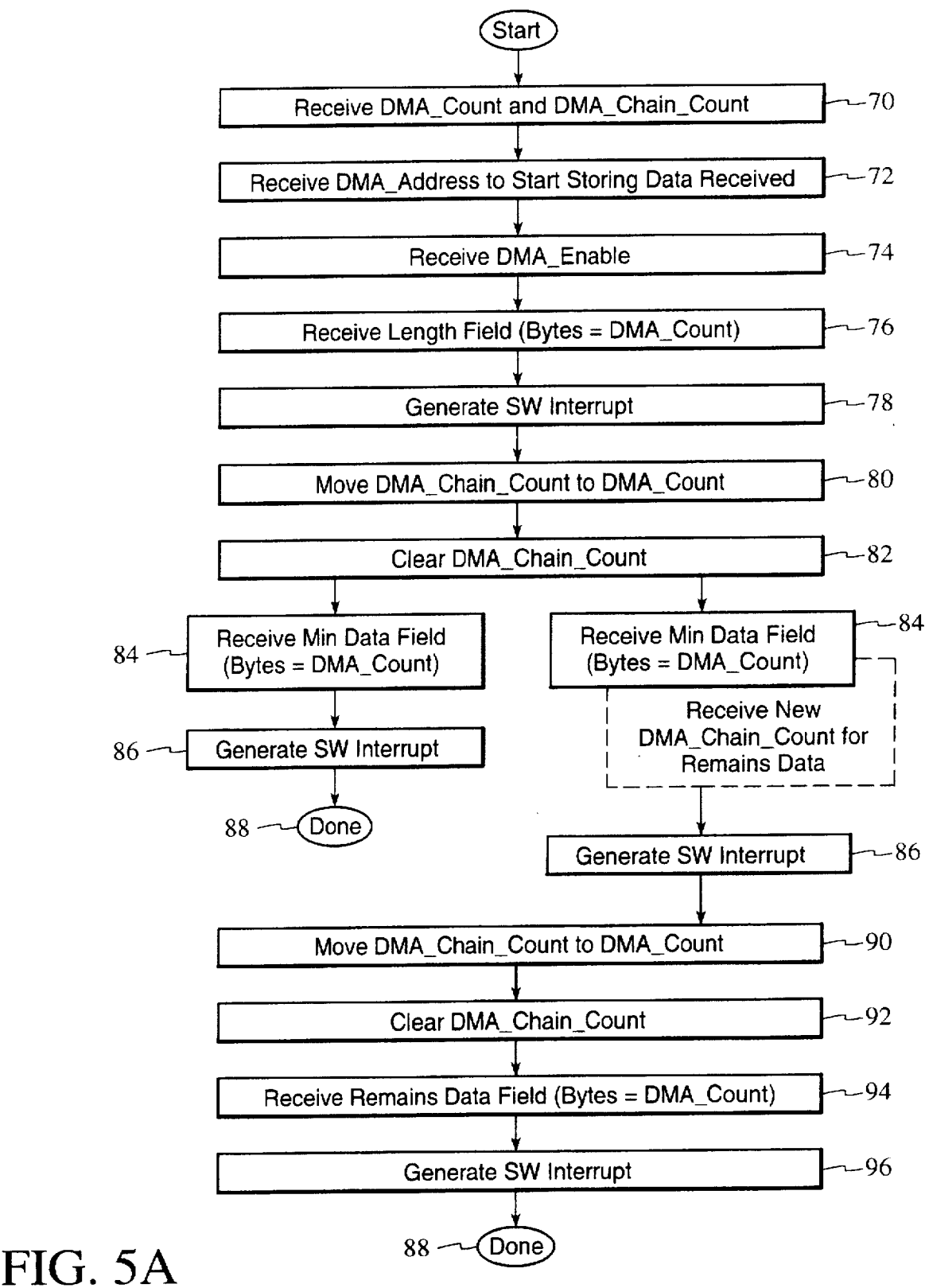

The flow charts of FIG. 4(a), 4(b) and 5(a) illustrate more particularly, preferred embodiments of the operation of the two registers, DMA_COUNT register 24 and DMA_CHAIN_COUNT register 26, in conjunction with the CPU 16, in accordance with the present invention. Preferably, the method aspects as illustrated by the flow charts of FIGS. 4(a) and 4(b) are stored in the ROM 12 (FIG. 1), as is well understood by those skilled in the art. Alternatively, of course, the method may be stored and supplied on any suitable computer storage medium, including an external floppy disk and executed from RAM 14.

As shown in FIG. 4(a), the operation begins when the CPU is ready to receive a data packet from a serial device 22, via step 30. The initialization of the DMA_COUNT register 24 for counting the reception of a desired number of bytes, e.g., two, of incoming serial data occurs via step 32. Of course, the number of bytes chosen for the initialization of the DMA_COUNT register 24 is system and protocol dependent, and preferably is equivalent to the length field, i.e., a number of bytes in a data packet that contain the length of the data portion of the data packet. The DMA_CHAIN_COUNT register 26 is then initialized to a minimum value, for example, two, via step 34.

Referring back to FIG. 3, there is a 2 byte length field and 2 byte minimum (min) data portion and one byte remains data portion. Accordingly, the DMA_CHAIN_COUNT register 26 is initialized to the minimum data portion of a packet, in this case, two, as above described. In another embodiment, the minimum data portion could, for example, be set such that the DMA_CHAIN_COUNT register 26 is initialized to the smallest value as defined by the interrupt latency in the computer system, i.e., to guarantee interrupt service for the DMA channel 21 prior to receiving that number of bytes.

The address for storing the packet in the RAM 14 (FIG. 1) is then specified, via step 36, and the setup for the DMA interrupt occurs, via step 40. A variable for counting interrupts, IntCount, is set to a zero value via step 42, and the DMA is enabled via step 44 to complete the arming of the DMA to await the receipt of the length and minimum data of the data packet.

FIG. 4(b) illustrates one embodiment of an interrupt routine for handling the DMA interrupts based on the order of the interrupts received from the DMA. Of course, actual implementation of the ideas expressed by this diagram may vary upon need. The interrupts occur at designated points during the receipt of the data packet, as described in more detail with reference to FIG. 8. The handling routine begins with receipt of an interrupt, via step 46. A determination of whether the interrupt received is the first interrupt, i.e., whether the variable IntCount has a value of zero, is made via step 48. When the interrupt is the first interrupt, the length field, e.g., the first two bytes, of the data packet has been received, and the length value of the data packet, as contained in the length data and stored in RAM 14 is received, via step 50.

A determination of whether the length value is greater than the length of the minimum portion, i.e., the minimum data packet length, of the data packet is made via step 52. When the length value is greater than the minimum length, the difference between the actual length and the minimum length of the data packet is stored in the DMA_CHAIN_COUNT register, via step 54. The variable IntCount is set to one via step 56 before returning from the interrupt routine via step 58.

Upon receipt of an interrupt via step 46, again a check of the value of IntCount is made via step 48. Since the value is now at one (via step 56), the routine continues via step 60. The variable IntCount is then set to two via step 62, before returning from the interrupt routine. Upon the receipt of another interrupt via step 46, the IntCount value is now at two, and thus the routine continues via step 64 with the receipt of the entire packet. The DMA is cleared via step 66 before returning from the interrupt routine. When the length value is not greater than the minimum length, i.e., step 52 is negative, the process continues via step 62, as described above. Of course, in this situation, there is only the minimum data and no remains data to be received in step 64. In this case only two interrupts are received.

The generation of the interrupts with DMA channel 21 is described with reference to the flow diagram of FIG. 5(a). As shown in FIG. 5(a), the values for use with the DMA_COUNT register 24 and DMA_CHAIN_COUNT register 26 (set up via steps 32 and 34 of FIG. 4(a)), are received and an address for storing the data is received, via steps 70 and 72. Although, these two receiving steps are presented in a particular sequence, one of ordinary skill in the art readily recognizes that these two steps could be interchanged and that would be within the spirit and scope of the present invention. The enable signal (provided in step 44, FIG. 4(a)) is received, via step 74. The receipt of the data packet then begins with the receipt of the length field from the data packet, via step 76, which in a preferred embodiment, is two bytes.

Once the length field has been received, the count in the DMA_COUNT register 24 has been reduced to zero, and an interrupt is generated, via step 78. The value from DMA_CHAIN_COUNT register 26 is transferred to DMA_COUNT register 24, via step 80, and the DMA_CHAIN_COUNT register 26 is cleared, via step 82. Thus, the count of the minimum data portion is loaded from DMA_CHAIN_COUNT register 26 into DMA_COUNT register 24 (i.e. a primary chaining of DMA_COUNT register 24 and DMA_CHAIN_COUNT register 26 occurs) to allow more serial data to be received.

It should be appreciated that although steps 78, 80, and 82 are shown as separate steps in the flow diagram of hardware operations, they appear to the software as occurring substantially simultaneously.

The receipt of the data packet continues until the DMA_COUNT register 24 has been reduced to zero, via step 84, and an interrupt is generated, via step 86. At this point, the routine of FIG. 4(b) preferably has determined whether the data packet exceeds the minimum length (via step 52). When the minimum length matches the actual length of the data packet, the receipt of the data packet is finished, via step 88.

When the data packet is longer than the minimum length, the DMA_CHAIN_COUNT register 26 preferably receives the difference value (via step 54, FIG. (4(b)), while the data packet data is being received via step 84, and before an interrupt is generated upon completion, via step 86. When the data packet length is greater than the minimum length, the difference value stored in the DMA_CHAIN_COUNT register 26 is transferred to DMA_COUNT register 24, via step 90, to allow the remains of the data packet to be received. Thus, secondary chaining of register DMA_CHAIN_COUNT register 26 to DMA_COUNT register 24 occurs, and data transfer from the serial device 22 continues until the transfer is complete.

The DMA_CHAIN_COUNT register 26 is cleared via step 92, and the remains of the data packet is received until the DMA_COUNT register 24 is reduced to zero, via step 94. An interrupt is generated upon completion of the receipt of the data packet, via step 96, before the operation is completed.

In a preferred embodiment, receiving the data (e.g., steps 76, 84, or 94) occurs as presented in the flow diagram of FIG. 5(a). Receipt of data begins in step 100. Upon receipt of a complete byte via step 102, the byte of data is moved to RAM 14 at the designated address location (set in step 36, FIG. 4(a)), via step 104. The address location is updated, such as by incrementing the address location to the next address location, via step 106. The value in the DMA_COUNT register 24 is then preferably decremented by one, via step 108. A determination of whether the DMA_COUNT register 24 has been decremented to zero is made via step 110. The process of receiving a byte and transferring to memory is repeated until the DMA_COUNT register 24 is reduced to zero. Of course, the address location could be updated by decrementing, and DMA_COUNT may use two's complement counts and increment, as is understood by those skilled in the art.

Thus, for example, in step 76, the DMA_COUNT register 24 is cleared after receipt of two bytes of data, i.e., the length field. In step 84, the DMA_COUNT register 24 is next cleared after receipt of the minimum portion, e.g., two bytes. In step 94, the DMA_COUNT register 24 is finally cleared after the remains of the data packet have been received.

With the present invention, the length of the data portion of the data packet being received is utilized to more efficiently handle reception of serial data. Accordingly, the chained data registers 24 and 26 utilize a difference value to allow the DMA channel 21 to process an entire data packet more efficiently.

Figure 6:
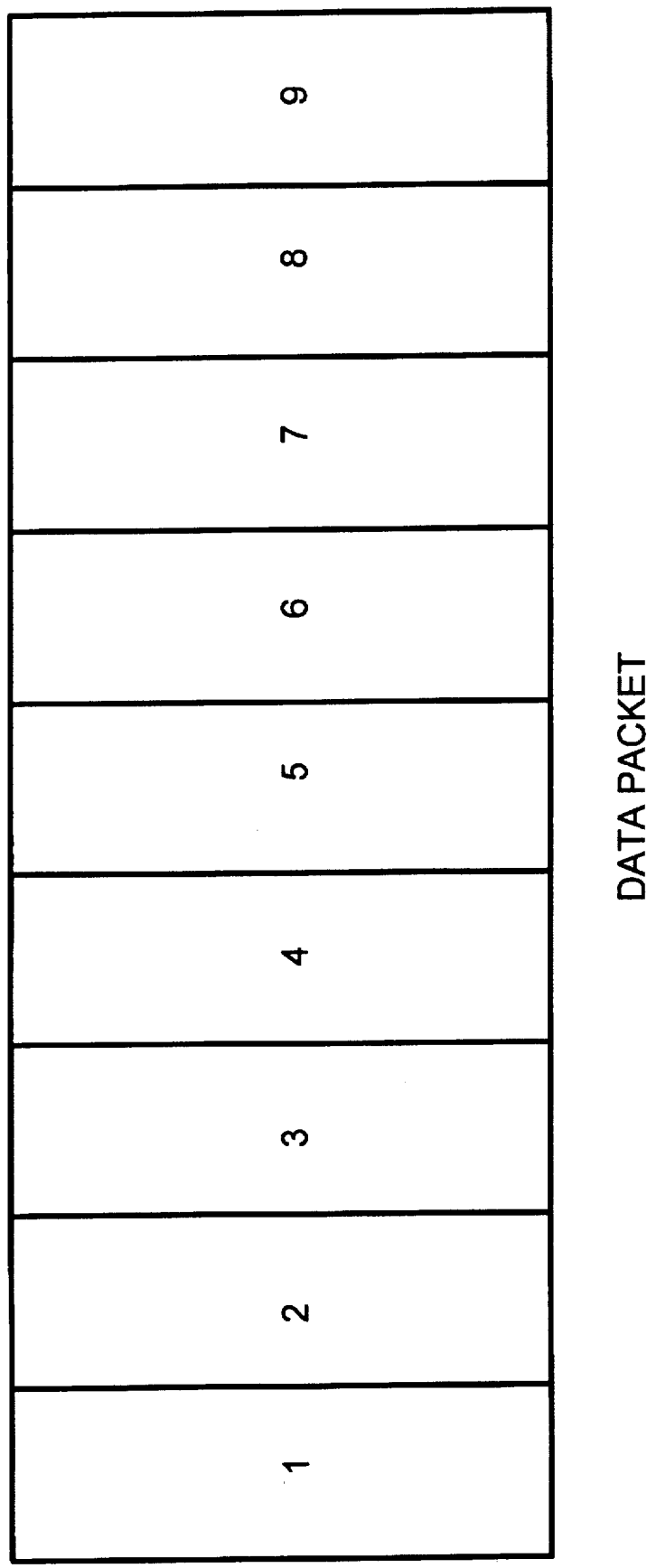
FIG. 6 illustrates a nine data byte packet that can be processed by a system in accordance with the present invention.

Referring now to FIG. 6, a data packet is illustrated that has an overall length of nine data bytes. As has before been mentioned, in a preferred embodiment, the number of bytes in the length field is not included in the value of the minimum length. Thus, for example, if the system has a length field of 4, and a minimum data packet length of 4, the DMA_COUNT register 24 will be initialized to receive the first four data bytes for the length field, and the next 4 bytes for the minimum portion will be set up for receipt through initialization of the DMA_CHAIN_COUNT register 26 to a value of four.

Through secondary chaining of the DMA_COUNT register 24 and the DMA_CHAIN_COUNT register 26, the last remains data bytes of the data portion will be received, since the difference value of one between the actual length of the data portion of the data packet, 5, and the minimum length of the data packet, 4, is provided to the DMA_CHAIN_COUNT register 26. The receipt of this data occurs with interrupts at the appropriate intervals, as above described. With the present invention, the DMA channel 21 is able to continue to automatically handle a full data packet. Such an ability to handle an entire data packet achieves a maximum possible throughput, substantially eliminates polling, and substantially reduces CPU overhead.

Figure 7A:
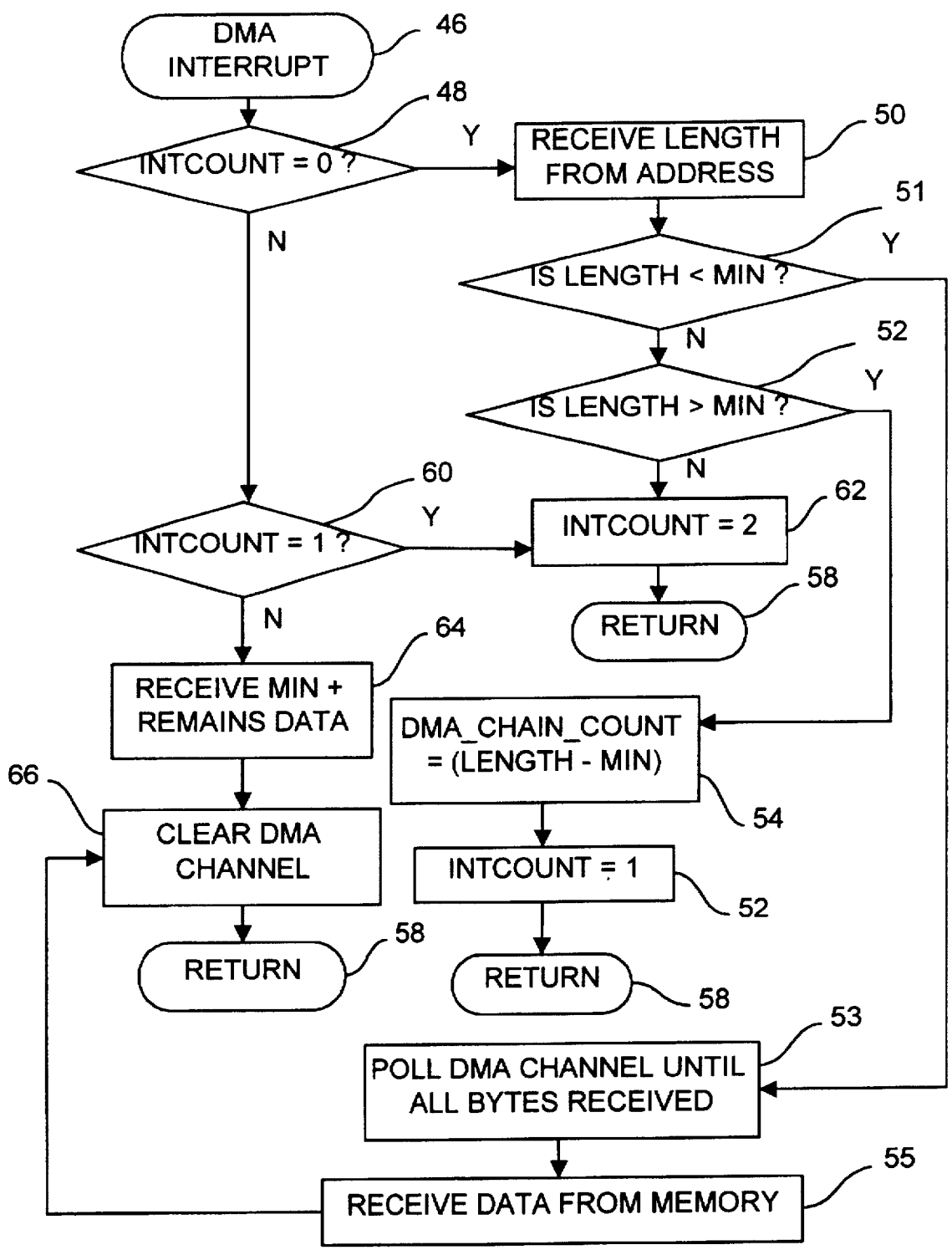
FIGS. 7(a) and 7(b) are flow charts illustrating the operation of a system in accordance with an alternate embodiment of the present invention.

In another example, a situation where the minimum data packet length exceeds the actual length of the data packet is identified and handled. FIG. 7(a) is a flow diagram of the operation of the present invention in terms of the DMA interrupt handler routine, in which like numerals to FIG. 4(b) have been used to illustrate equivalent steps. As shown, the alternate embodiment differs from that of FIG. 4(b) by the inclusion of step 51, in which, after the length data is received, a determination of whether the length of the data packet is less than the minimum length is made. If so, the operation continues with polling of the DMA until the entire data packet is received, via step 53, as is well understood by those skilled in the art. Data is received via step 55, and the process continues with the clearing of the DMA channel, via step 66, as described above with reference to FIG. 4(b).

Figure 7B:
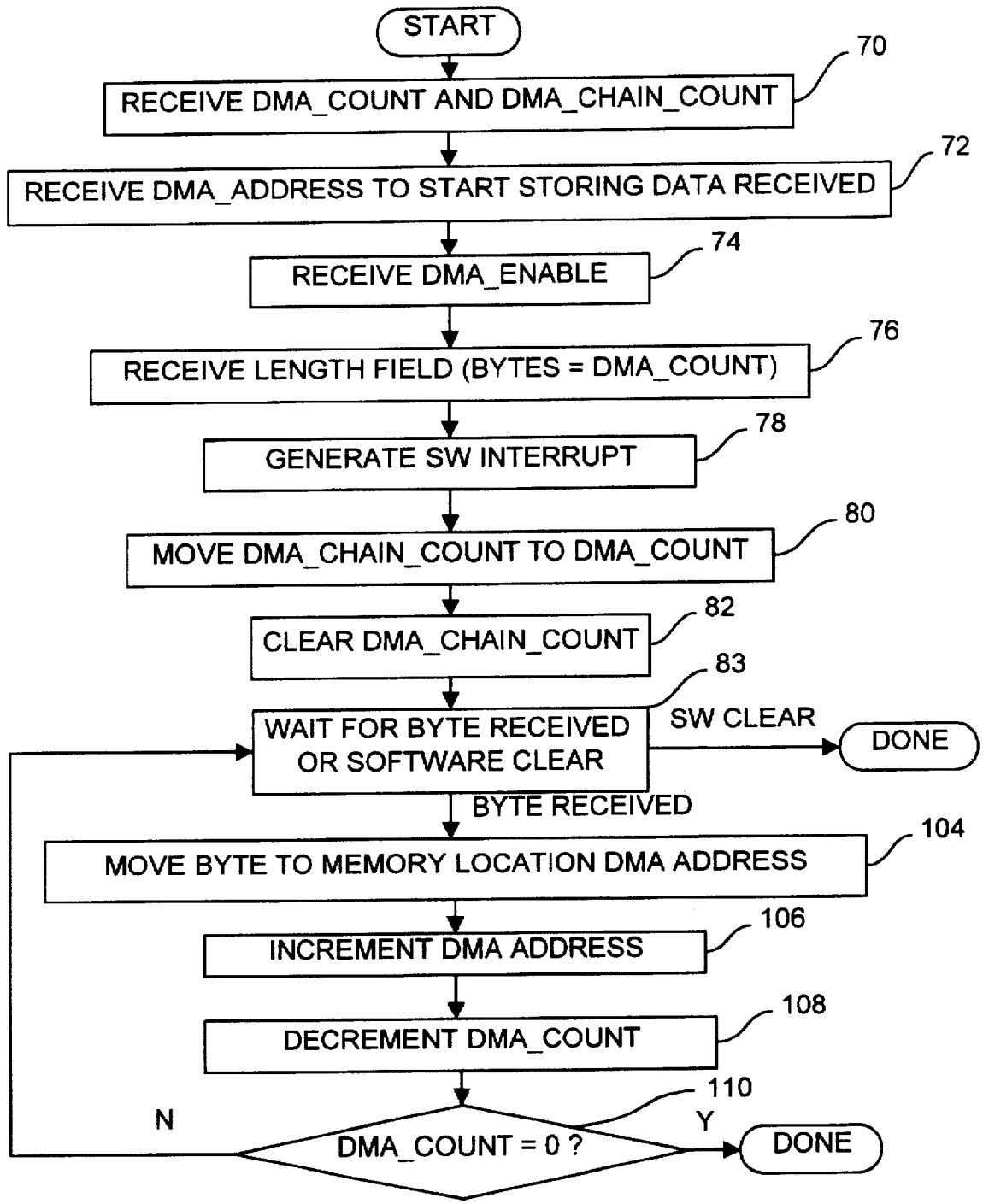

FIG. 7(b) presents a flow diagram of an alternate embodiment of the logic operations corresponding with the routine of FIG. 7(a) for the situation when the data packet length is less than the minimum length. The operation proceeds similarly to that of FIG. 5(a) and thus, like steps are labelled equivalently. Once the DMA_CHAIN_COUNT register 26 has been cleared via step 82, the operation continues via step 83.

During and/or after step 83, the routine of FIG. 7(a) preferably has determined that the data packet length is shorter than the minimum length, via step 51. The logic routine must then wait for receipt of a byte of data or a software clear, via step 83. If a byte is received, the byte is moved to memory via step 104, as described with reference to FIG. 5(a). The operations then continue with the incrementing of the memory address and decrementing of the DMA_COUNT register value, again as described above with reference to FIG. 5(a). Since the packet is shorter than the minimum length, the alternate embodiment waits for the software clear signal to occur upon determination of the end of packet via polling steps 53, 55, and 66 of FIG. 7A. Once the clear signal is received (as produced by step 66, FIG. 7A), the operation is completed.

Further, during the interrupt handling routine, it may be necessary to check for the running of the DMA channel 21 to determine if data has been received in buffers of the SCC 18 before the DMA_CHAIN_COUNT register 26 has been updated with the difference value. Such checking may be necessary if there has been a delay for some reason in the routine, and is appropriately done during step 54, FIG. 4(b). If the DMA channel has already completed the minimum transfer, the difference value must be stored in DMA_CHAIN_COUNT and the DMA channel restarted. As long as the maximum latency time of the controller has not been exceeded, the DMA channel is suitably enabled to receive the data in the buffers, as well as any additional data in the data packet. Of course, preferably the minimum length has been chosen to be large enough to avoid such problems with the latency and to coincide with the real minimum length.

Figure 8:
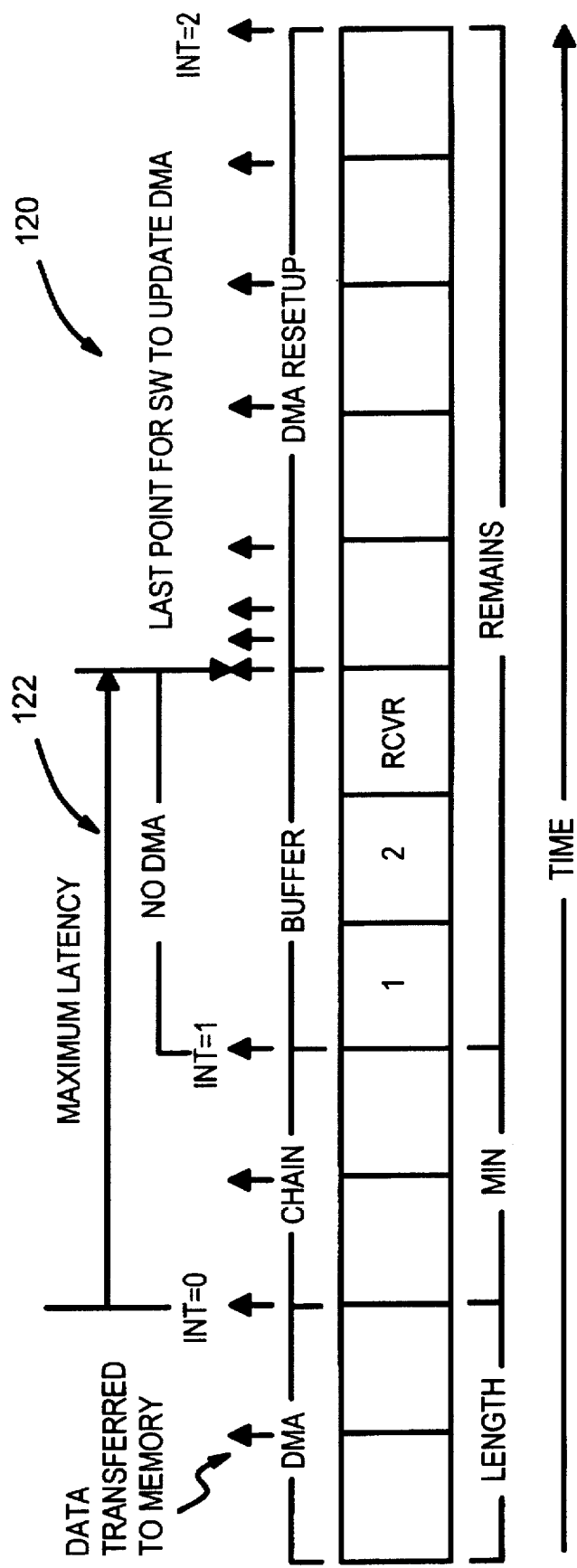
FIG. 8 illustrates an example of timing restraints for avoiding data loss in an alternate aspect of the present invention.

FIG. 8 illustrates an example 120 of the time restraints for properly checking for a running DMA channel to avoid losing data. As shown, length data for this example is received in the first two bytes of data. A minimum length is chosen as two, so that when an interrupt occurs (Int=0) the next two bytes of data are also received. For illustrative purposes, there are two buffers plus the receive shift register in the SCC which can receive data after another interrupt (Int=1) even though transferring data to RAM 14 will be delayed. Thus, as long as the DMA running check is performed and the DMA is restarted before the buffers are full i.e., before the maximum latency time has been exceeded (indicated by 122), the data in the buffers, as well as any additional data in the data packet, is properly received.

With the system of the present invention, several advantages over traditional polled (i.e., non-DMA) and standard DMA transfers are realized. In contrast to non-DMA transfers, the present invention uses only two or three interrupts, rather than one interrupt per byte. In contrast to DMA transfers with handshaking that use send request, acknowledge, and send data messages, in the present invention only one message is required, rather than the two incoming and one outgoing of standard DMA transfers.

Although the present invention has been described in accordance with the embodiments shown, one of ordinary skill in the art will recognize that there could be variations to the embodiment and those variations would be within the spirit and scope of the present invention. For example, although the initialization steps and decision steps in the present invention are presented with a particular order, the sequence of steps may be altered while achieving the intended purposes of the present invention.

Accordingly, many modifications may be made by one of ordinary skill without departing from the spirit and scope of the present invention, the scope of which is defined by the following claims.

We claim:

1. A method for increasing the throughput of serial data in a computer system when a data packet is of unknown length, the computer system including a central processing unit (CPU), random access memory (RAM), read only memory (ROM), and at least one serial device, the method comprising:

(a) initializing a first count register to count a length field of the data packet, the length field including a value indication of the length of the data packet;
    (b) initializing a second count register to store a predetermined count for a minimum data portion;
    (c) receiving the data packet from at least one serial device;
    (d) transferring the length field to the RAM;
    (e) loading the predetermined count for the minimum data portion into the first count register to provide primary chaining of the first count register to the second count register; and
    (f) comparing a minimum data packet length to the length value of the length field in the RAM to determine whether to utilize secondary chaining of the first count register with the second count register.

2. The method of claim 1 wherein step (f) further comprises determining if the minimum data packet length is less than the length value, wherein when the minimum data packet length is less than the length value, a difference between the minimum data packet length and the length value is determined, the difference is stored in the second count register, secondary chaining is utilized and the data packet is transferred to RAM.

3. The method of claim 2 wherein step (f) further comprises determining if the minimum data packet length is equal to the length value, wherein when the minimum data packet length is equal to the length value, secondary chaining is not utilized and the data packet is transferred to RAM.

4. The method of claim 3 wherein step (f) further comprises determining if the minimum data packet length is greater than the length value, wherein when the minimum data packet length is greater than the length value, secondary chaining is not utilized, and the data packet is transferred to RAM until the length value has been transferred as determined by polling.

5. The method of claim 1 wherein the length field is two bytes.

6. The method of claim 1 wherein the length field is four bytes.

7. The method of claim 1 wherein the minimum data packet length comprises a byte value equivalent to a minimum portion of the data packet and accounting for a latency time of the CPU.

8. The method of claim 1 wherein the minimum data packet length comprises a number of bytes of the minimum portion and a remains portion of the data packet.

9. The method of claim 7 wherein the minimum data packet length comprises a number of bytes of the length field, the minimum portion, and a remains portion of the data packet.

10. A DMA system for increasing the throughput of serial data in a computer system when a data packet is of unknown length, the computer system including a central processing unit (CPU), random access memory (RAM), read only memory (ROM), a serial communication controller (SCC), and at least one serial device, the DMA system comprising:

- interface logic, the interface logic controlling data transfer of the data packet to the RAM, the data packet including a value indication of data packet length;
- a first count register coupled to the interface logic and counting the transfer of the data packet; and
- a second count register coupled to the first count register, wherein the first count register and the second count register are chained together to utilize a difference value between the data packet length in the first count register and a chosen value for a minimum data packet length in the second count register to allow for increased throughput in the transfer of the data packet with the RAM.

11. The system of claim 10 wherein the first count register counts a length field of the data packet indicating a length value of the data packet transferred to the RAM.

12. The system of claim 11 wherein the second count register transfers a count for a minimum data portion to the first count register following the transfer of the length field.

13. The system of claim 12 wherein the CPU compares the data packet length with the minimum data packet length.

14. The system of claim 13 wherein when the CPU determines that the data packet length is greater than the minimum data packet length, the difference value is utilized and the CPU enables secondary chaining of the second count register to the first count register.

15. The system of claim 14 wherein when the CPU determines that the data packet length is equal to the minimum data packet length, the difference value is not utilized.

16. The system of claim 15 wherein when the CPU determines that the data packet length is less than the minimum data packet length, the difference value is not utilized and the CPU polls the first count register to monitor data packet transfer completion.

17. The system of claim 14 wherein the second count register stores the difference value between the data packet length and the minimum data packet length.

18. A computer-implemented method for increasing the throughput of serial data in a computer system when a data packet is of unknown length via program instructions stored on a computer readable medium comprising:

- initializing a first count register to count a length field of the data packet, the length field including a value indication of the length of the data packet;
- initializing a second count register to store a predetermined count for a minimum data portion;
- receiving the data packet from at least one serial device;
- transferring the length field to the RAM;
- loading the count for the minimum data portion into the first count register to provide primary chaining of the first count register to the second count register; and
- comparing a minimum data packet length to the length value in the RAM to determine whether to utilize secondary chaining of the first count register with the second count register.

* * * * *